(12) United States Patent
Darling et al.

(10) Patent No.: US 10,947,901 B2
(45) Date of Patent: Mar. 16, 2021

(54) GAS TURBINE ENGINE COMPRESSOR SECTIONS AND INTAKE DUCTS INCLUDING SOFT FOREIGN OBJECT DEBRIS ENDWALL TREATMENTS

(71) Applicant: HONEYWELL INTERNATIONAL INC., Morris Plains, NJ (US)

(72) Inventors: Timothy Darling, Phoenix, AZ (US); Costantinos Vogiatzis, Gilbert, AZ (US)

(73) Assignee: HONEYWELL INTERNATIONAL INC., Charlotte, NC (US)

(*) Notice: Subject to any disclaimer, the term of this patent is extended or adjusted under 35 U.S.C. 154(b) by 115 days.

(21) Appl. No.: 16/201,635

(22) Filed: Nov. 27, 2018

(65) Prior Publication Data

US 2020/0165973 A1    May 28, 2020

(51) Int. Cl.
*F02C 7/05*    (2006.01)

(52) U.S. Cl.
CPC .......... *F02C 7/05* (2013.01); *F05D 2220/323* (2013.01); *F05D 2220/3217* (2013.01); *F05D 2260/607* (2013.01)

(58) Field of Classification Search
CPC .............................. F02C 7/05; F05D 2260/607
See application file for complete search history.

(56) References Cited

U.S. PATENT DOCUMENTS

| | | | | |
|---|---|---|---|---|
| 4,666,371 A | * | 5/1987 | Alderson | F01D 21/045 415/197 |
| 5,152,134 A | * | 10/1992 | Boyd | F01D 25/32 60/39.092 |
| 5,160,248 A | * | 11/1992 | Clarke | F01D 21/045 156/276 |
| 6,149,380 A | * | 11/2000 | Kuzniar | F01D 21/045 415/173.4 |
| 7,581,397 B2 | * | 9/2009 | Strangman | F04D 29/441 415/121.2 |
| 7,963,094 B1 | * | 6/2011 | Cupolo | F02C 7/05 244/53 B |

(Continued)

FOREIGN PATENT DOCUMENTS

| | | |
|---|---|---|
| EP | 2607656 A2 | 6/2013 |
| EP | 3067531 A1 | 9/2016 |
| WO | 02/29224 A1 | 4/2002 |

*Primary Examiner* — Ninh H. Nguyen
*Assistant Examiner* — Brian Christopher Delrue
(74) *Attorney, Agent, or Firm* — Lorenz & Kopf, LLP

(57) ABSTRACT

Gas turbine engine (GTE) compressor sections and compressor intake ducts are provided having Soft Foreign Object debris (SFOD) endwall treatments, which reduce peak damage to GTE components in the event of SFOD ingestion. In embodiments, the GTE compressor section includes a compressor rotor and a compressor intake duct. The compressor intake duct includes an intake flow passage, which extends through compressor intake duct to the compressor rotor. A first duct endwall extends around a centerline of the flow passage to bound a peripheral portion of the intake flow passage. An SFOD endwall treatment includes topological features formed in or otherwise provided on the first duct endwall. The topological features of the SFOD endwall treatment are configured such that SFOD impacting the topological features is directed in a radially inward direction toward the flow passage centerline prior discharge of the SFOD from the intake flow passage and into the compressor rotor.

20 Claims, 6 Drawing Sheets

(56) References Cited

U.S. PATENT DOCUMENTS

| | | | | |
|---|---|---|---|---|
| 8,337,146 B2* | 12/2012 | Yu | F01D 11/122 | 415/119 |
| 8,939,706 B1* | 1/2015 | Lee | F01D 11/122 | 415/1 |
| 8,968,437 B2* | 3/2015 | Kline | F02C 7/05 | 55/306 |
| 9,091,207 B2* | 7/2015 | Chanez | F02C 7/05 | |
| 9,151,181 B2* | 10/2015 | Robertson | F01D 25/24 | |
| 9,156,561 B2* | 10/2015 | Hurlburt | B64D 33/02 | |
| 9,243,511 B2* | 1/2016 | Lee | F01D 11/122 | |
| 9,403,601 B1* | 8/2016 | Boateng | B64D 33/02 | |
| 9,427,835 B2* | 8/2016 | Cheung | B23P 17/00 | |
| 9,709,275 B2* | 7/2017 | de Diego | F23R 3/002 | |
| 2006/0153483 A1* | 7/2006 | Bridges | F01D 25/16 | 384/475 |
| 2008/0069688 A1* | 3/2008 | Harper | F01D 21/045 | 415/196 |
| 2013/0160411 A1* | 6/2013 | Mayer | F02C 7/052 | 55/418 |
| 2014/0352795 A1* | 12/2014 | Kline | F02C 7/055 | 137/15.1 |
| 2015/0300208 A1* | 10/2015 | Beutin | F01D 25/32 | 415/121.2 |
| 2015/0377074 A1* | 12/2015 | de Diego | F23R 3/002 | 60/39.092 |
| 2016/0122552 A1* | 5/2016 | Strock | F01D 11/001 | 60/805 |
| 2016/0177824 A1* | 6/2016 | Ponton | F02C 7/052 | 60/779 |
| 2017/0167279 A1* | 6/2017 | Kirby | C04B 41/52 | |
| 2017/0234160 A1* | 8/2017 | Gemeinhardt | F02C 7/05 | 415/200 |
| 2020/0011203 A1* | 1/2020 | Prabhakar | F01D 25/005 | |
| 2020/0123924 A1* | 4/2020 | Finlayson | F01D 21/045 | |
| 2020/0123925 A1* | 4/2020 | Finlayson | F02C 7/05 | |
| 2020/0123976 A1* | 4/2020 | Finlayson | F01D 21/045 | |

* cited by examiner

GAS TURBINE ENGINE COMPRESSOR SECTIONS AND INTAKE DUCTS INCLUDING SOFT FOREIGN OBJECT DEBRIS ENDWALL TREATMENTS

TECHNICAL FIELD

The present invention relates generally to gas turbine engines and, more particularly, to gas turbine engine compressor sections and intake ducts having endwall treatments for reducing peak physical damage from the ingestion of soft foreign objects.

ABBREVIATIONS

Abbreviations appearing relatively infrequently in this document are defined upon initial usage, while abbreviations appearing more frequently in this document are defined below.
FOD—foreign object debris;
GTE—gas turbine engine; and
SFOD—soft foreign object debris.

BACKGROUND

As air-breathing engines, GTEs are prone to the ingestion of various types of FOD, particularly when utilized as propulsive engines for aircraft. Commonly ingested FOD ranges from air-entrained particulate matter, such as grains of sand and droplets of low temperature moisture; to larger bodies of debris, typically bird fragments. In contrast to smaller FOD bodies, larger FOD bodies are capable of imparting significant physical damage to certain GTE components upon impact. Leading rotating GTE components, such as early stage compressor rotors, are particularly susceptible to physical distortion from impact with larger ingested FOD bodies. The blades of a leading compressor rotors, for example, may be subject to pronounced physical distortion or "blade fold-over" if impacted by a larger FOD body or mass in a vulnerable region of the rotor, such as the rotor blade tips. Depending upon severity, the resulting structural distortion can prematurely limit the service life of the compressor rotor and may reduce the overall performance of the GTE compressor section. Strategic thickening of the compressor blades may enable a compressor rotor to better withstand FOD impact, while incurring lower levels of peak physical damage. Such a solution is suboptimal, however, and typically requires certain inexorable tradeoffs, such as increased part weight and cost of manufacture.

There thus exists a continued industry demand for the provision of GTE compressor sections and intake ducts better able to withstand the ingestion of larger FOD objects, including bird fragments, while limiting peak physical damage to early stage compressor rotors and other GTE components in the event of FOD impact. Ideally, such GTE compressor sections and intake ducts could be produced with relatively little, if any additional manufacturing cost, aerodynamic penalty, and weight increase relative to conventional GTE compressor sections and intake ducts. Other desirable features and characteristics of embodiments of the present disclosure will become apparent from the subsequent Detailed Description and the appended Claims, taken in conjunction with the accompanying drawings and the foregoing Background.

BRIEF SUMMARY

GTE compressor sections are disclosed having intake ducts, which feature unique duct endwall treatments (herein, "SFOD endwall treatments"). The duct endwall treatments reduce peak damage to compressor rotors and other GTE components downstream of the intake duct in the event of SFOD ingestion; that is, the ingestion of FOD objects, such as bird fragments, having relatively soft or gelatinous consistencies. In embodiments, the GTE compressor section contains a compressor rotor, which is positioned downstream of a compressor intake duct. An intake flow passage extends through compressor intake duct to an inlet of the compressor rotor. A first duct endwall extends around a centerline of the flow passage (e.g., coaxial with the centerline and rotational axis of the compressor rotor) to bound a peripheral portion of the intake flow passage. An SFOD endwall treatment is formed in or otherwise provided on selected regions of the first endwall duct. The SFOD endwall treatment includes topological features, such as raised and/or recessed surface features, which are configured (sized, shaped, and positioned) to direct SFOD impacting the topological features in a radially inward direction toward the flow passage centerline prior discharge of the SFOD from the intake flow passage and entry of the SFOD into the inlet of the compressor rotor.

In further embodiments, the GTE compressor section includes a compressor rotor, such as an impeller, and a compressor intake duct upstream of the compressor rotor. An intake flow passage extends through compressor intake duct and is fluidly coupled to an inlet of the compressor rotor. The intake flow passage is bound about its outer periphery or circumference by an outer duct endwall, which extends around a centerline of the intake flow passage. Moving along the flow passage centerline in a fore-aft direction, the outer duct endwall includes first, second, and third segments forming first, second, and third angles of convergence, respectively, with respect to the flow passage centerline. The second segment of the outer duct endwall has a conical geometry and an angle of convergence (the second angle of convergence) exceeding that of the first and third segments (the first and third angles of convergences). An SFOD endwall treatment is provided on the outer duct endwall and includes a first plurality of topological features formed in the second, conical segment of the outer duct endwall.

Still further provided are embodiments of a compressor intake duct including an SFOD endwall treatment, which reduces peak structural damage to GTE components (e.g., compressor rotors) downstream of the compressor intake ducts when the compressor intake duct is installed within a GTE compressor section. In various implementations, the compressor intake duct includes an intake flow passage having a flow passage centerline, a first duct endwall bounding a peripheral portion of the intake flow passage, and an SFOD endwall treatment provided on the first duct endwall. The SFOD endwall treatment includes or consists of topological features, such as raised features and/or recessed features, formed at selected regions in the first duct endwall. The topological features are structurally configured (sized, shaped, and positioned) to redirect SFOD impacting the topological features in a radially inward direction toward the flow passage centerline prior discharge of the SFOD from the intake flow passage.

Various additional examples, aspects, and other useful features of embodiments of the present disclosure will also become apparent to one of ordinary skill in the relevant industry given the additional description provided below.

BRIEF DESCRIPTION OF THE DRAWINGS

At least one example of the present invention will hereinafter be described in conjunction with the following figures, wherein like numerals denote like elements, and.

Figure 1:
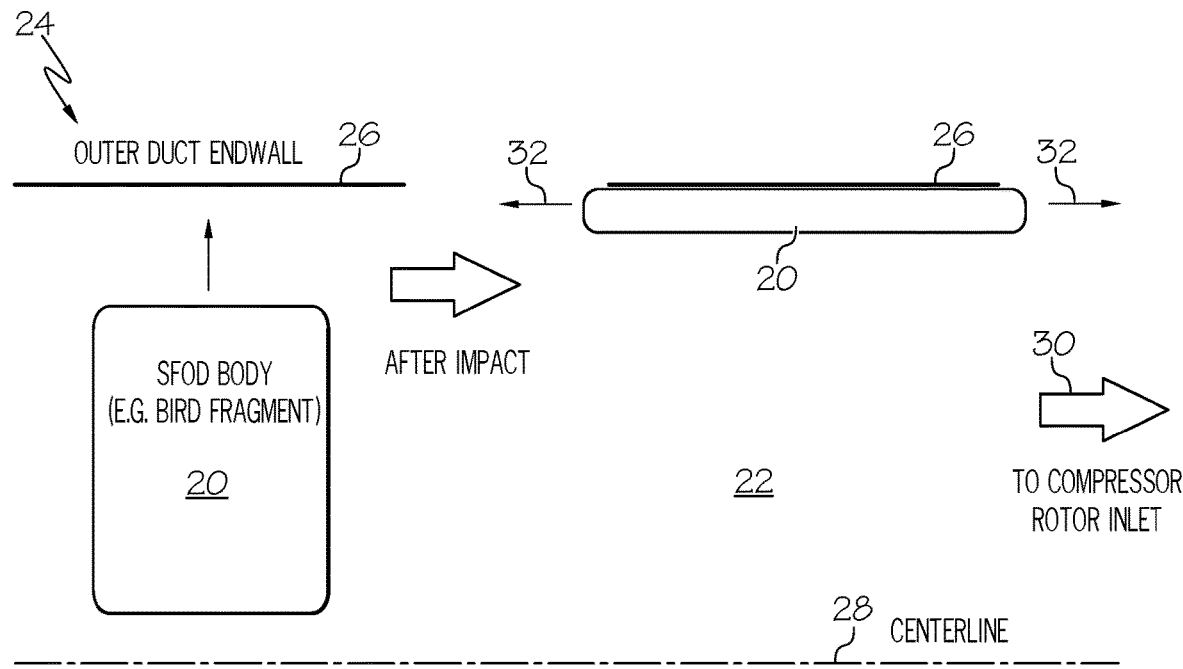
FIG. 1 is a generalized schematic illustrating one manner in which a GTE-ingested SFOD body, such as a bird fragment, may flatten impact and against an outer duct endwall having a smooth or featureless topology and subsequently trend toward an outer radial position when entering the inlet of a compressor rotor.

For simplicity and clarity of illustration, the drawing figures illustrate the general manner of construction, and descriptions and details of well-known features and techniques may be omitted to avoid unnecessarily obscuring the exemplary and non-limiting embodiments described in the subsequent Detailed Description. It should further be understood that features or elements appearing in the accompanying figures are not necessarily drawn to scale unless otherwise stated.

DETAILED DESCRIPTION

The following Detailed Description is merely exemplary in nature and is not intended to limit the invention or the application and uses of the invention. Furthermore, there is no intention to be bound by any theory presented in the preceding Background or the following Detailed Description.

Definitions

The following definitions apply throughout this document. Those terms not expressly defined here or elsewhere in this document are assigned their ordinary meaning in the relevant technical field.

Fore-aft direction—a direction progressing from the forward or leading part of a GTE or GTE component, such as a compressor intake duct, toward the aft or trailing part of the GTE or GTE component.

Inboard—a relative term indicating that a named component or structural element is located closer to the centerline of a GTE or the rotational axis of a compressor rotor than an "outboard" component or structural element, as defined below.

Outboard—a relative term indicating that a named component or structural element is located further from the centerline of a GTE or the rotational axis of a compressor rotor than an "inboard" component or structural element, as defined above.

Radially Inward—toward the centerline or rotational axis of a GTE or named GTE component, such as a compressor rotor or intake flow passage.

Topological Feature—a structural feature applied to or provided on (formed in or on) a surface of a duct endwall and which is raised or recessed with respect to the surface of the duct endwall. Examples include elongated ridges or ribs, localized protrusions or teeth, trenches, and other depressions applied to an inner or outer duct endwall.

Overview

As noted above, early stage compressor rotors and other rotating GTE components are susceptible to undesirably high levels of physical damage in the event of FOD ingestion, particularly when such GTE components are impacted by bird fragments or other large FOD bodies ingested into the GTE compressor section. A principal factor underlying this vulnerability relates to the sheer size or greater mass of larger FOD bodies as compared to smaller FOD bodies, which typically occur as air-entrained particulate matter. The present inventors have identified a second, contributing factor, however, which affects the manner in which larger FOD bodies typically behave when ingested into a GTE. Specifically, the present inventors have discovered that larger FOD bodies, as well as other FOD bodies having softer or more gelatinous consistencies, tend to flatten against streamlined, smooth, or featureless airflow guidance surfaces upon impact. For example, and in contrast to hard FOD objects having greater rigidities, an SFOD object will tend to deform into a relatively thin, disc-like form factor when impinging a duct endwall bounding an intake flow passage. Following impact, the flattened SFOD object further shows a propensity to remain in contact with (or at least remain in the proximity of) the duct endwall as the SFOD object progresses through the intake flow passage duct. This may be problematic when an SFOD object initially impinges against an outer duct endwall and remains in the proximity thereof until entering the inlet of a compressor rotor for reasons discussed more fully below.

FIG. 1 schematically illustrates the above-described phenomena in multistep sequence. With initial reference to the left side of this figure, block 20 (hereafter "SFOD body 20") represents an SFOD mass or body, which has been ingested into an intake flow passage 22 of a compressor intake duct 24. Compressor intake duct 24 is, in turn, contained in a larger GTE compressor section (not shown). An outer duct endwall 26 defines or bounds an outer peripheral portion of intake flow passage 22. Conventionally, and as shown in FIG. 1, outer duct endwall 26 is imparted with a featureless or smooth inner circumferential surface to provide an aerodynamically streamlined airflow guidance surface. When viewed in three dimensions, outer duct endwall 26 is an annular or tubular structure, which extends around the flow passage centerline (represented in by dashed line 28). While referred to below as "flow passage centerline 28," centerline 28 is also generally representative of the centerline of compressor intake duct 24; the centerline of the GTE compressor section, generally; and the centerline (and rotational axis) of a compressor rotor downstream of intake flow passage 22. Although not shown in FIG. 1 for clarity, compressor intake duct 24 may also include an inner duct endwall, which defines or bounds an inner periphery of intake flow passage 22.

At the juncture in time represented on the left side of FIG. 1, SFOD body 20 exists as a coherent mass in a relatively non-deformed state. Due to its relatively soft or gelatinous consistency, SFOD body 20 tends to flatten against outer duct endwall 26 upon impact, as previously noted. Specifically, and as indicated on the right side of FIG. 1 by arrows 32, SFOD body 20 tends to spread outward from the point of impact against the smooth inner surface of outer duct endwall 26. The mass of SFOD body 20 is, in essence, redistributed into flattened or pancake-like form factor, which may be somewhat conformal with the shape of impacted surface region of outer duct endwall 26. It has been determined that SFOD body 20, while in such a post-impact, deformed state, has a propensity to remain in proximity of outer duct wall 26, perhaps continuously or intermittently contacting duct wall 26, as SFOD body 20 progresses along intake flow passage 22. Due to this behavior, SFOD body 20 may remain in proximity of outer duct endwall 26 when exiting intake flow passage 22, and entering the inlet of the compressor rotor, as indicated in FIG. 1 by arrow 30. Accordingly, there exists an increased likelihood that SFOD body 20 will initially impact the compressor rotor in outer peripheral regions, such as at or near the blade tips of the compressor rotor, which rotate at peak angular velocity and which may be particularly vulnerable to sustaining physical damage if impacted by SFOD body 20.

Figure 2:
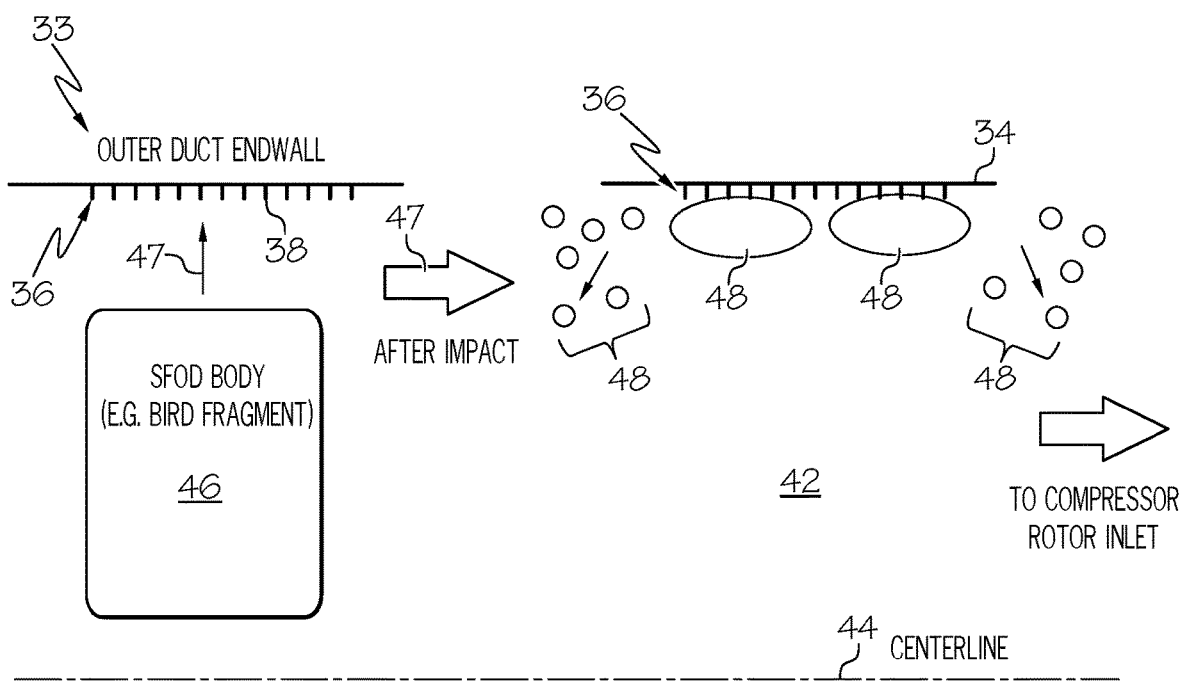
FIG. 2 is a schematic illustrating one manner in which an SFOD body, following impact with an outer duct wall to which an SFOD endwall treatment is applied, may be redirected in a radially inward direction after impact with topological features included in the endwall treatment, as depicted in accordance with a generalized embodiment of the present disclosure.

Turning to FIG. 2, a compressor intake duct 33 included in a GTE compressor section (not shown) is schematically depicted in accordance with an embodiment of the present disclosure. Compressor intake duct 33 is similar to compressor intake duct 24 described above in connection with FIG. 1, but further includes an endwall treatment 36 applied to or provided on selected regions of outer duct endwall 40. Endwall treatment 36 includes a number of topological features 38, which are formed at selected locations in or on outer duct endwall 40. As discussed more fully below, topological features 38 serve to decrease peak physical damage to a compressor rotor (or rotors) downstream of intake duct 33 in the event of SFOD ingestion, providing the ingested SFOD objects impinges features 38. For this reason, endwall treatment 36 is referred to hereafter as "SFOD endwall treatment 36." SFOD endwall treatment 36 may also help reduce damage imparted to GTE components by other types of FOD, including FOD objects or particles composed of rigid materials; however, the principal purpose of SFOD endwall treatment 36 is reduce peak physical damage resulting from SFOD ingestion through the below-described mechanisms.

Compressor intake duct 33 includes an outer duct endwall 40, which bounds an outer peripheral portion of intake flow passage 42. Outer duct endwall 40 and intake flow passage 42 may be axisymmetric with respect to a flow passage centerline 44, which is also representative of the centerline of compressor intake duct 33 and the centerline or rotational axis of one or more compressor rotors downstream of intake duct 33. Topological features 38 may be integrally formed with outer duct endwall 40, or a section of outer duct endwall 40, as a single piece in at least some embodiments. In this regard, topological features 38 may be formed in outer duct endwall 40 by casting, by additive manufacturing, or by machining, to list but a few examples. As will be discussed in detail below, topological features 38 can include raised features (e.g., features or structures protruding from outer duct endwall 40 in radially inward directions toward centerline 44), recessed features (e.g., trenches or other depressions extending into endwall 40 in radially outward directions away from centerline 44), or a combination of raised and recessed features. In many instances, topological features 38 will be formed in one or more annular bands or groupings, which extend around centerline 44 and an inner circumferential surface of outer duct endwall 34. The locations at which SFOD endwall treatment 36 are usefully applied and examples of various forms that may be assumed by topological features 38 are further discussed below in connection with FIGS. 4-10.

SFOD endwall treatment 36 limits peak physical damage to a GTE components, such as a compressor rotor, downstream of intake flow passage 42 in the event of SFOD ingestion. In embodiments, SFOD endwall treatment 36 may provide this benefit, at least in part, by facilitating spatial dissociation or physical separation of SFOD body from outer duct endwall 40 and toward flow passage centerline 28 following SFOD impact against topological features 38. Stated differently, and in contrast to the scenario illustrated in FIG. 1, SFOD bodies impinging upon SFOD endwall treatment 36 have an increased propensity to be redirected in a radially inward direction toward flow passage centerline 44 rather than remain in proximity of outer duct endwall 34; or, at minimum, are permitted to dissociate or separate from outer duct endwall 34 following SFOD impact. As a result, ingested SFOD bodies are more likely to exit intake flow passage 42 in a radially-constricted band and thereby impinge the compressor rotor at an inboard locations closer to centerline 44; e.g., proximate the hub flow path, the blade roots, or in similar locations on the compressor rotor. As compressor rotors are typically better capable of tolerating SFOD impact at such locations, any physical damage or distortion imparted to the compressor rotor (particularly to the rotor blades) due to SFOD impact may be reduced, if not entirely mitigated. Concurrently, as a secondary function, SFOD endwall treatment 36 may help cleave or separate the SFOD body into a number of smaller pieces. Due to their reduced volume, such pieces may also have a decreased propensity of imparting peak physical damage to the compressor rotor; however, such cleaving of SFOD body 46 is not required to achieve the desired effect in all embodiments.

The above-described functionality of SFOD endwall treatment 36 is further schematically illustrated in FIG. 2 on a step-by-step basis. Referring initially to the left side of FIG. 2, an SFOD body 46 ingested into intake flow passage 42 is depicted as a coherent mass having a non-deformed or slightly deformed form. As indicated in FIG. 2 by arrows 47, SFOD body 46 may impinge against outer duct endwall 40 at a location corresponding to SFOD endwall treatment 36. Upon impinging against SFOD endwall treatment 36, and specifically topological features 38, SFOD body 46 is spatially redistributed in at least one of two manners. First, SFOD body 46 may be redirected in a radially inward direction away from endwall treatment 36 and toward flow passage centerline 44, as indicated on the right side of FIG. 2. Second, SFOD body 46 may be cleaved or divided into smaller pieces 48 having reduced volumes, as further illustrated on the right side of FIG. 2. Consequently, due to impingement of SFOD body 46 against SFOD endwall treatment 36, smaller SFOD pieces 48 are generated, which tend to exit flow passage 42 and enter the inlet of the compressor rotor inlet at radially inboard locations closer to centerline 44. Peak physical damage to the compressor rotor may be reduced as a result should SFOD pieces 48 come into contact with the rapidly rotating compressor wheel.

Figure 3:
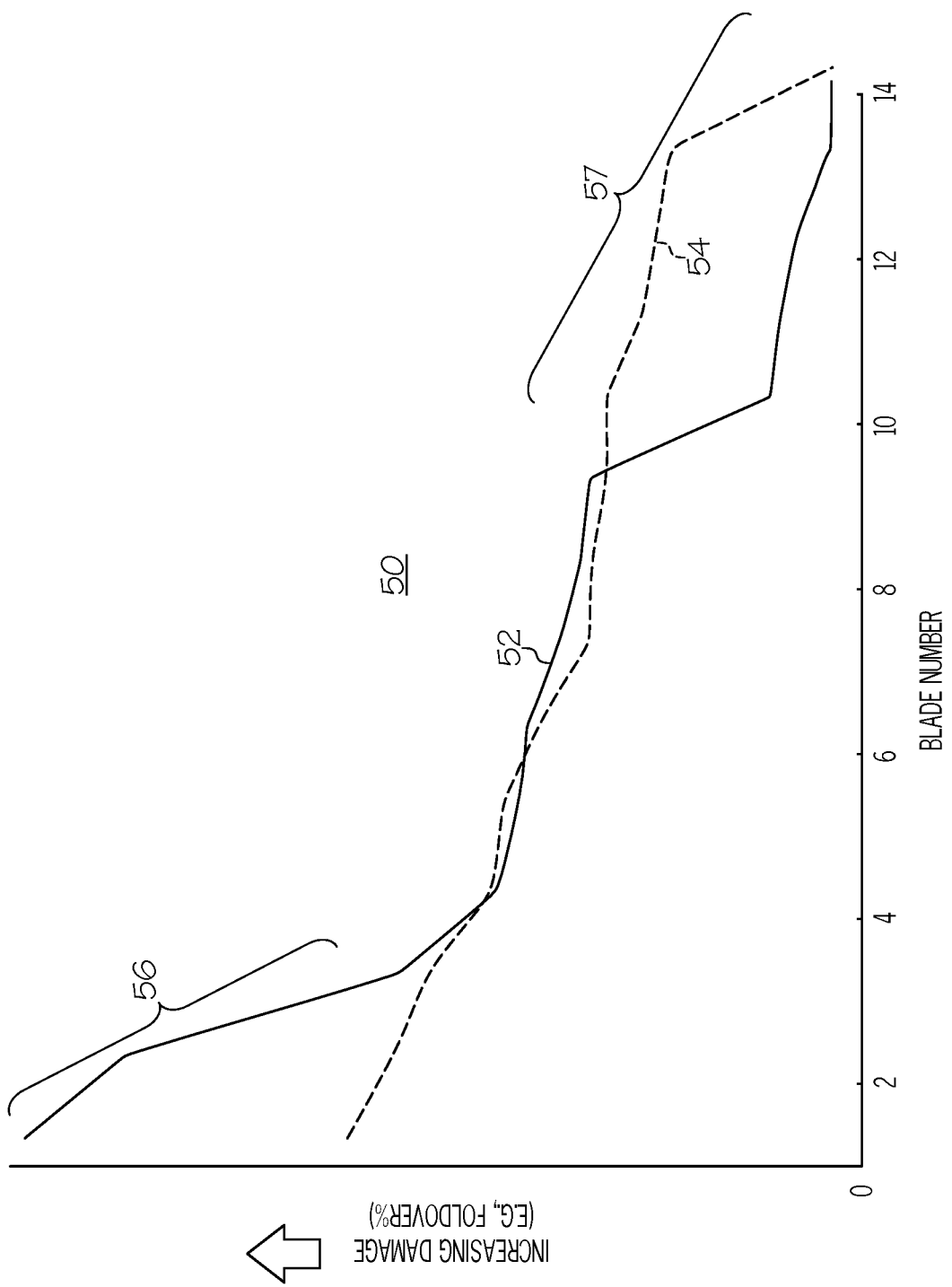
FIG. 3 is a graph comparing compressor blade deformation or "fold-over" due to a simulated SFOD ingestion event for a GTE intake section including an SFOD endwall treatment relative to a GTE intake section lacking a SFOD endwall treatment.

FIG. 3 is a graph 50 setting-forth simulation results comparing compressor blade deformation in the event of SFOD ingestion for two compressor sections. The vertical axis of graph 50 represents increasing physical damage or deformation of the rotor blades with increasing distance from the origin (expressed in terms of "fold-over percentage"), while the horizontal axis represents the number of blades experiencing a particular level of physical damage. Trace 52 represents simulation results for a compressor section containing conventional ducting lacking any SFOD endwall treatment, such as that shown in FIG. 1. Conversely, trace 54 plots simulation data for a compressor section including an SFOD endwall treatment and, specifically, an endwall treatment formed at a duct endwall location similar or identical to that described below in connection with FIG. 4 and including topological features in the form of raised ridges similar or identical to those described below in connection with FIGS. 5-6.

As can be seen in FIG. 3, multiple compressors blades were subjected to severe physical damage in the case of the conventional GTE compressor section lacking any SFOD endwall treatment (trace 52). This is indicated by leftmost section 56 of trace 52, noting its vertical rise above the leftmost section of trace 54. Comparatively, in the case of the GTE compressor section including a selectively-applied SFOD endwall treatment (trace 54), peak physical damage to the compressor rotor blades was reduced. Specifically, the number of compressor blades exhibiting severe or excessive fold-over decreased, while a greater number of blades experienced slight to moderate physical deformation (indicated by segment 57 of trace 54). This is an improved outcome in the event of SFOD ingestion. Further description of the embodiments of the SFOD endwall treatment will now be provided in conjunction with FIGS. 5-10. First, however, a general description of a GTE compressor section including an SFOD endwall treatment is set-forth in connection with FIG. 4 to provide an exemplary, albeit non-limiting context in which embodiments of the present disclosure may be better understood.

Exemplary Compressor Section Including SFOD Endwall Treatments

Figure 4:
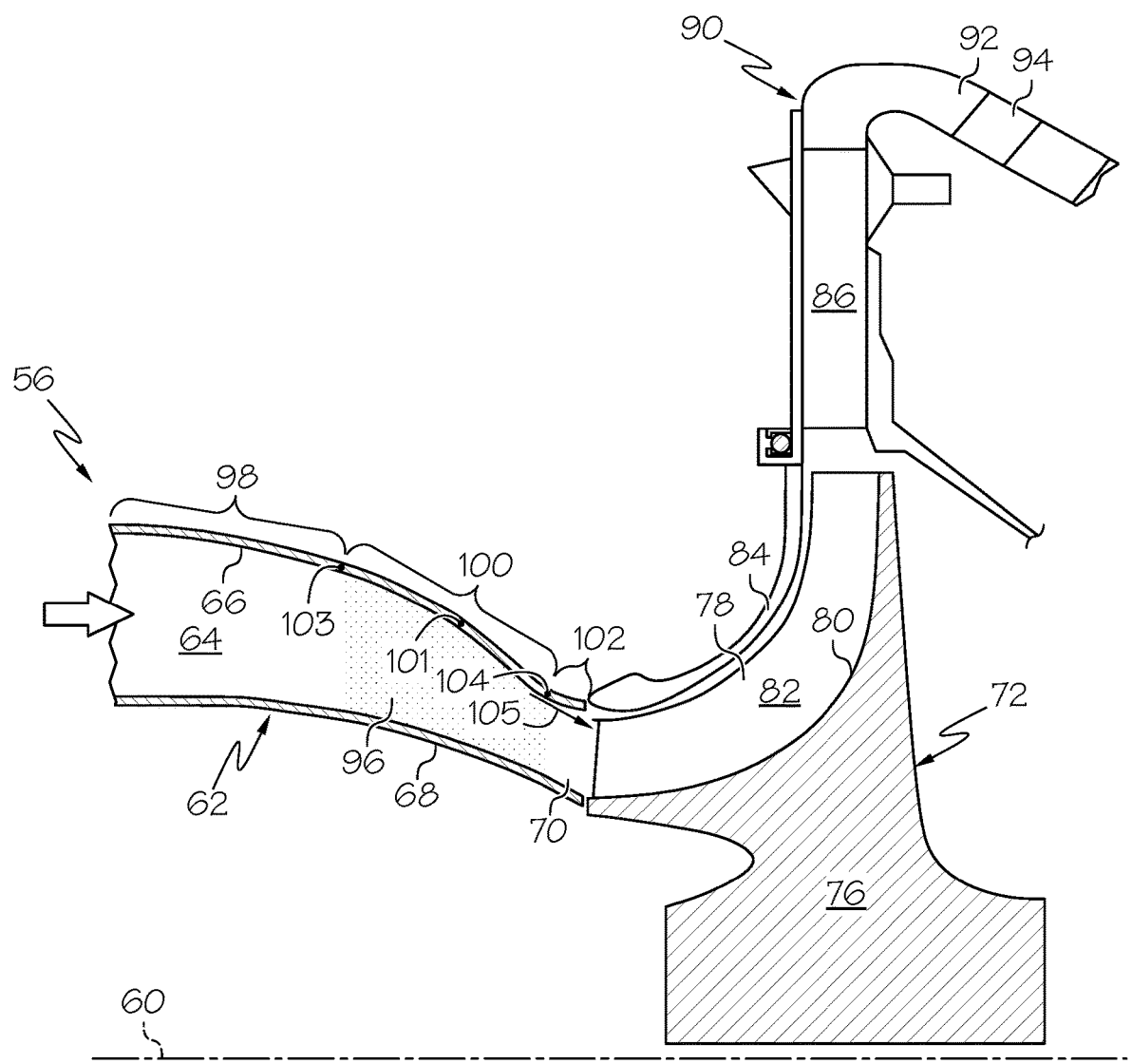
FIG. 4 is a cross-section view of a GTE intake section (partially shown) including a compressor rotor and a compressor intake duct having an SFOD endwall treatment (generically represented by dot stippling), as illustrated in accordance with an exemplary embodiment of the present disclosure.

Advancing to FIG. 4, a portion of a GTE compressor section 56 is depicted in accordance with an exemplary embodiment of the present disclosure. GTE compressor section 56 includes a compressor intake duct 62 through which an intake flow passage 64 extends. Compressor section 56, compressor intake duct 62, and intake flow passage 64 are generally axisymmetric about a flow passage centerline 60. Accordingly, intake flow passage 64 may have a generally annular or conical geometry when viewed in three dimensions. An outer duct endwall 66 defines or bounds an outer peripheral portion of intake flow passage 64, while an inner duct endwall 68 defines or bounds an inner periphery of flow passage 64. Intake flow passage 64 terminates in an flow passage outlet 70, which directs airflow into the inlet of a compressor rotor 72. In the illustrated example, compressor rotor 72 is a centrifugal compressor or impeller and is consequently be referred to hereafter as "impeller 72." In other embodiments, compressor rotor 72 may assume a different form, such as that of an axial or mixed-flow compressor rotor. Further, while only a single compressor stage is shown in FIG. 1, embodiments of the SFOD endwall treatment can be employed within GTEs having various types of multistage compressor sections.

Impeller 72 includes a disk hub 76 from which a plurality of blades 78 extends. Blades 78 wrap tangentially around disk hub 76 in a twisting or spiral pattern. While a limited portion of impeller 72 is shown in FIG. 1, disk hub 76 is also generally axisymmetric around the rotational axis of GTE compressor section 56 and the centerline of impeller 72. Disk hub 76 of impeller 72 has an outer surface or "hub" 80 and a number of impeller flow paths 82, which extend from the inlet of impeller 72 to the outlet thereof. Impeller flow paths 82 are generally defined or bound by hub 80 and blades 78. An impeller shroud 84 is further mounted within GTE compressor section 56 around impeller 72 to enclose impeller flow paths 82. The pressurized airflow discharged from impeller 72 in radially outward directions is received by one or more diffuser flow passages 86, which are contained within diffuser structure 88. Diffuser structure 88 is contained within a larger diffusion system 90, which is positioned radially outboard of impeller 72 and impeller shroud 84 as shown. Diffusion system 90 also includes a bend 92 and a deswirl portion 94, which guides airflow received from impeller 72 into a non-illustrated combustor section downstream of compressor section 56.

An SFOD endwall treatment 96 is applied to or provided on a selected region or selected regions of outer duct endwall 66 (and/or of inner duct endwall 68). The location or locations of outer duct endwall 66 to which the topological features are applied will vary amongst embodiments, as will the particular type or types of topological features included in endwall treatment 96. In certain instances, it may be advantageous to apply SFOD endwall treatment 96 to the interior surface of a selected conical section of outer duct endwall 66, with the conical section converging toward flow passage centerline 60 at a higher rate when moving along centerline 60 in a fore-aft direction than do the other sections of duct endwall 66. Such a positioning may increase the likelihood of contact between an ingested SFOD object and SFOD endwall treatment 96, while further imparting the SFOD object with a trajectory having a higher vector component in a radially inward direction should the SFOD object impact endwall treatment 96. Consider, for example, FIG. 4 in which the illustrated portion of outer duct endwall 66 is conceptually divided into three segments: a first segment 98, a second segment 100, and a third segment 102. Endwall segment 100 is located between endwall segments 98, 100 and is thus referred to as "intermediate endwall segment 100." Endwall segments 98, 100, 102 possess three different (average) angles of convergence toward centerline 60, as taken in a fore-aft direction, in the illustrated embodiment. Intermediate endwall segment 100, specifically, has a conical geometry when viewed in three dimensions and the greatest (e.g., average) angle of convergence toward centerline 60. The angle of converge of intermediate endwall segment 100 exceeds that of upstream endwall segment 98 and downstream endwall segment 100, which may have conical or tubular geometries. SFOD endwall treatment 96 may thus be formed in intermediate, conical segment 100, in whole or in part, to achieve the benefits set-forth above.

As just stated, SFOD endwall treatment 96 is usefully applied to (e.g., formed in or on) a conical segment of outer duct endwall 66, which converges toward centerline 60 when moving in a fore-aft direction. Specifically, as described above, SFOD endwall treatment 96 may be applied to a conical endwall segment, such as intermediate endwall segment 100, possessing the greatest angle of convergence toward centerline 60. In FIG. 4, the point or region of maximum convergence (the greatest angle formed by the interior surface of outer duct endwall 66 with respect to centerline 60) is identified by marker 101. In embodiments, SFOD endwall treatment 96 may be beneficially applied to endwall 66 at a location extending across this point or region. In addition to extending over the greatest angle of convergence of outer duct endwall 66 (point 101), SFOD endwall treatment 96 further extends from an forward-most point 103 to an aft-most point 104 on outer duct endwall 66. In the illustrated example, aft-most point 104 is located at or adjacent a point of endwall inflection; that is, a point in which the curvature of duct endwall 66 transitions from a concave to a tubular or convex shape, as shown in FIG. 4.

Forward of inflection point 104, SFOD objects impacting SFOD endwall treatment 96 may be imparted with a greater inward radial component to more effectively redirect impinging SFOD objects toward centerline 60. Aft of this point, the provision of endwall treatment 96 may be less effective in that SFOD objects may be imparted with a decreased vector component in a radially inward direction. Accordingly, in at least some embodiments, SFOD endwall treatment 96 terminates at or adjacent the point of inflection (point 104) moving along centerline 60 in a fore-aft direction. This notwithstanding, endwall treatment 96 may extend beyond point 104 and, perhaps, to the trailing terminal end of outer duct endwall 66 in other embodiments; e.g., as may be useful when endwall treatment 96 further functions by cleaving SFOD objects into smaller pieces and/or when endwall treatment 96 includes topological features having convergent, ramp-like geometries, as described below in conjunction with FIG. 8. Finally, arrow 105 in FIG. 4 generally identifies a trajectory SFOD objects impinging upon conical endwall section 100 may travel toward the outer tips of impeller blades 78 in the absence of SFOD endwall treatment 96.

As previously indicated, SFOD endwall treatment 96 contains or consists of a plurality of relatively small topological features formed in outer duct endwall 66. Such topological features may be, for example, a repeating geometric pattern of raised features, recessed features, or a combination of raised and recessed features. These features may be applied to (e.g., formed in or on) selected locations along outer duct endwall 66 and/or along inner duct endwall 62, as discussed below. As point of emphasis, such topological features can include any combination of raised and/or recessed surface features, which are shaped, dimensioned, and distributed to provide the SFOD protection functionalities described herein. Examples of several different types of topological features will now be described in conjunction with FIGS. 5-9, again noting that such features can be combined and otherwise modified in further embodiments of GTE compressor section 56 without limitation.

Figure 5:
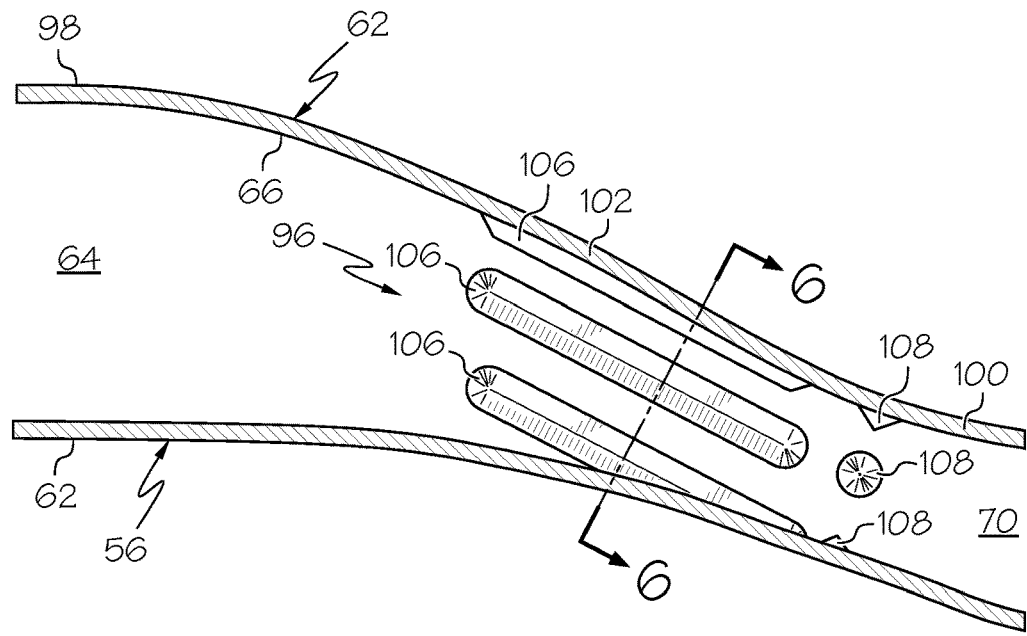
FIGS. 5-9 are cross-sectional views illustrating several exemplary topological features, any combination of which may be included in the exemplary SFOD endwall treatment shown in FIG. 4.
Figure 6:
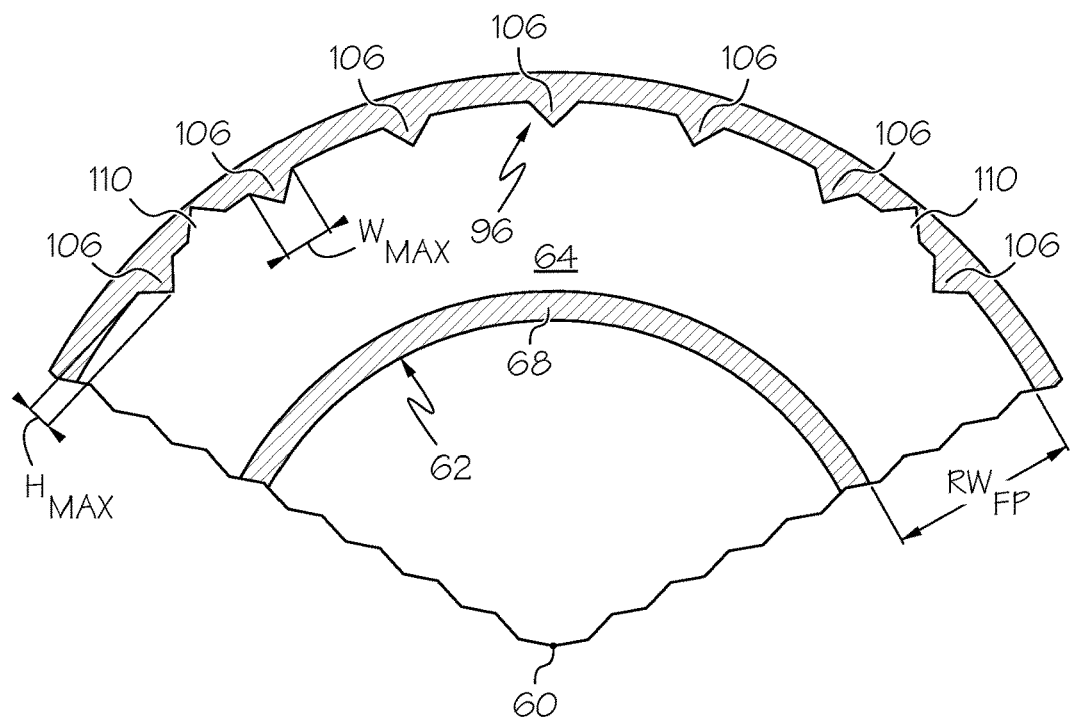
Figure 7:
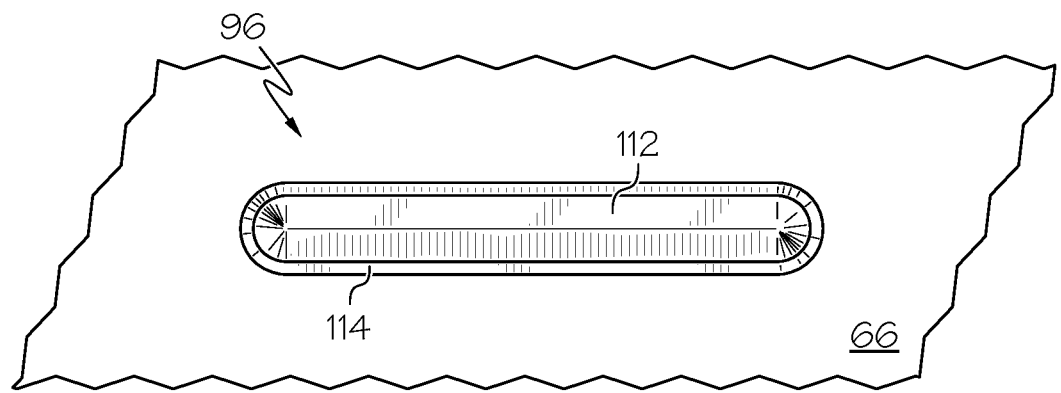
Figure 8:
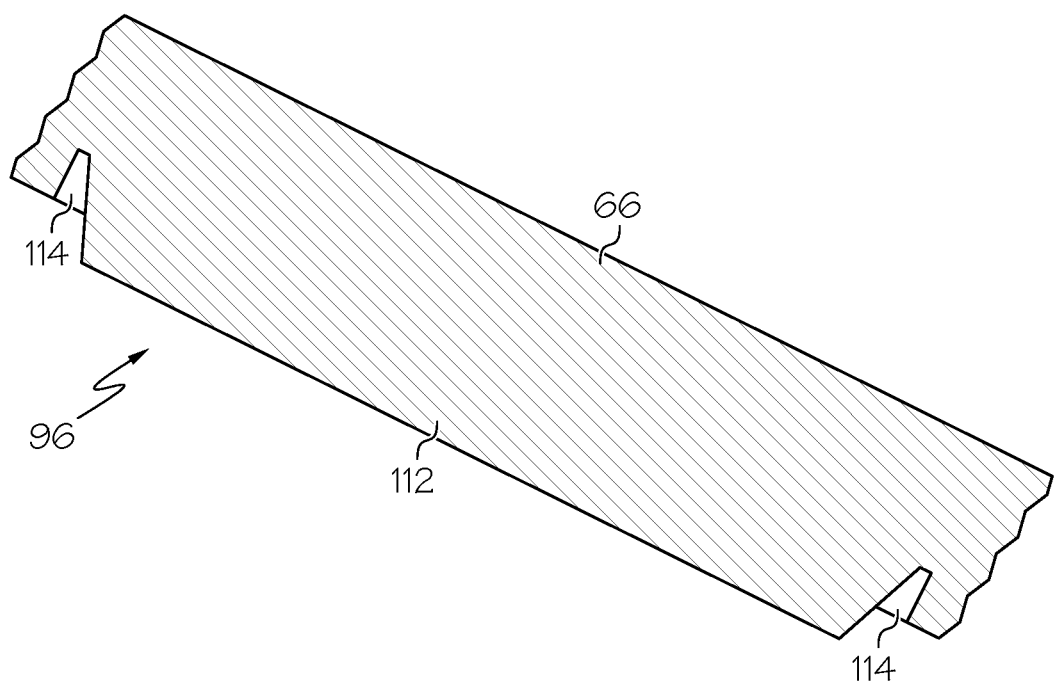

Referring initially to FIGS. 5-6, a portion of compressor intake duct 62 is shown in cross-section, with SFOD endwall treatment 96 illustrated as including certain topological features 106, 108, 110. The cross-section of FIG. 5 is taken along a section plane containing flow passage centerline 60, while the cross-section shown in FIG. 6 is taken along a section plane orthogonal to centerline 60 and transecting topological features 106, 110. FIGS. 5 and 6 are not drawn to scale, with the dimensions of features 106, 108, 110 exaggerated for illustrative clarity. Here, SFOD endwall treatment 96 includes a first type of raised topological feature 106 in the form of elongated ribs, spines, or ridges. Ridges 106 are angularly spaced or circumferentially distributed around outer duct endwall 66 in an annular array, as taken in a section plane orthogonal to flow passage centerline 60. Elongated ridges 106 may be angularly spaced around centerline 60 at substantially regular intervals; or, instead, spaced at irregular intervals in concentrated clusters or groupings. Ridges 106 are elongated along their respective lengths and are imparted with substantially wedge-shaped or triangular cross-sectional profiles, as shown most clearly in FIG. 6. Consequently, the respective widths of ridges 106 decrease with increasing distance from outer duct endwall 66. Ridges 106 may extend substantially parallel to centerline 60 (FIGS. 4 and 6), ridges 106 may wrap or twist about centerline 60, or ridges 106 may have a different spatial orientation relative to centerline 60. In the illustrated example, elongated ridges 106 extend along conical intermediate segment 102 of outer duct endwall 66, while terminating prior to reaching downstream segment 100 of endwall 66. In other embodiments, elongated ridges 106 may extend over and across downstream segment 100 of outer duct endwall 66 and, perhaps, may extend to upstream segment 98 of endwall 66. The spines or peaks of ridges 106 have substantially straight or linear profiles in the illustrated example, but may be imparted with different (e.g., undulating or serrated) profiles in further implementations of endwall treatment 96.

As discussed above, elongated ridges 106 project from outer duct endwall 66 in radially inward directions toward flow passage centerline 60 (FIGS. 4 and 6). As identified in FIG. 6, elongated ridges 106 may be imparted with maximum heights ($H_{MAX}$), as measured along axes extending in radial directions relative to centerline 60; and maximum widths ($W_{MAX}$), as taken about an inner circumference of outer duct endwall 66. The respective heights of elongated ridges 106 may vary from ridge to ridge or may, instead, remain constant between ridges 106. Similarly, the respective heights of ridges 106 may remain constant or, instead, may vary along flow passage centerline 60 in a fore-aft direction. In certain implementations, the respective heights of elongated ridges 106 may increase when progressing in a fore-aft direction to impart ridges 106 with ramped geometries similar or identical to those described below in conjunction with FIG. 9. The particular value of $H_{MAX}$ will vary among embodiments as selected by the designer; however, in one non-limiting example in which intake flow passage 64 has a predetermined radial width (identified as "$RW_{FP}$" in FIG. 6), as measured along an axis perpendicular to centerline 60 at a location adjacent ridges 106, $W_{MAX}$ may be between about 0.1% and about 10% of $RW_{FP}$ to achieve the desired SFOD protection functionality, while minimizing or preventing any aerodynamic effect created by ridges 106. In still other instances, $W_{MAX}$ may be greater than or less than the aforementioned range.

As shown in FIG. 5, SFOD endwall treatment 96 may further include a second type of raised features 108 in addition or in lieu of elongated ridges 106. In the illustrated example, this second type of raised feature assumes the form of localized protrusions or teeth 108. Localized protrusions 108 may taper to a tip or point. Accordingly, as protrusions 108 may also have triangular-shaped cross-sectional profiles, as taken in a section plane orthogonal to centerline 60. Further, as do elongated ridges 106, protrusions 108 decrease in width when moving in a radially inward direction away from outer duct endwall 66 and toward flow passage centerline 60. Localized protrusions 108 are distributed in linear rows or lines with ridges 106 in the illustrated example; however, in further embodiments, protrusions 108 may interspersed with elongated ridges 106 or may otherwise have a different spatial disposition with respect to ridges 106. The respective heights of protrusions 108 may be substantially equivalent to $H_{MAX}$ or may instead vary relative thereto. For example, in the illustrated example in which protrusions 108 are located downstream of ridges 106, localized protrusions 108 may be imparted with increased heights relative to ridges 106 to provide a convergent ramp geometry when transitioning from ridges 106 to protrusions 108 in fore-aft directions. In yet further implementations, rows of protrusions 108 may be substituted for ridges 106; or protrusions 108 may be omitted from SFOD endwall treatment 96.

With continued reference to FIGS. 5-6, and addressing specifically FIG. 6, SFOD endwall treatment 96 further includes a third type of topological feature, namely, trenches 110. In contrast to raised or protruding features 106, 108, trenches 110 are recessed features, which have depths extending into outer duct endwall 66, as shown in FIG. 6; and which may extend alongside ridges 106 for similar or equivalent distances. Trenches 110 are advantageously imparted with V-shaped geometries, which may mimic the shape of elongated ridges 106 considered inversely. Thus, in such embodiments, the widths of trenches 110 may decrease with increasing distance from centerline 60. Trenches 110 can be replaced by other types of recessed features in alternative implementations, including circumferential grooves or more localized cavities. Alternatively, SFOD endwall treatment 96 may lack any such recessed features. As a still further possibility, and as shown in FIG. 6, SFOD endwall treatment 96 may include both raised and recessed features, with the recessed features (e.g., trenches 110) interspersed with raised features (e.g., ridges 106) as taken around an inner circumferential of outer duct endwall 66. Thus, any combination of such features can be tailored to provide the above-described functionality of redirecting SFOD bodies toward centerline 60 and/or of cleaving SFOD bodies into smaller pieces prior to discharge from intake flow passage 64 and entry into the compressor rotor (or rotors) downstream of compressor intake duct 62 (e.g., impeller 72 shown in FIG. 4).

The topological features included within SFOD endwall treatment 96 can assume still other forms in addition or in lieu of those described above. For example, in certain embodiments, raised and recessed features may be combined to increase the effective height of the topological features making-up the endwall treatment. Consider, for example, topological features 112, 114 shown in FIGS. 7 and 8. In this case, topological feature 112 assumes the form of an elongated, raised ridge 112 similar to ridge 106 described above in connection with FIGS. 5-6. Conversely, topological feature 114 assumes the form of a peripheral recess or moat 114, which is formed in the interior surface of duct endwall 66 adjacent raised ridge 112; e.g., moat 114 extends at least partially, if not fully around a base portion of raised ridge 112. This combination of features may increase the effective maximum height of ridge 112, as measured from the floor of moat 114; which may, in turn, enhance the effectiveness of the endwall treatment in breaking-up or redirecting SFOD objects impinging upon features 112, 114 in the manner previously discussed. A plurality of features 112, 114 may thus be distributed in a repeating geometric pattern around selected portions the interior surface of outer duct endwall 66 to form or define SFOD endwall treatment 96 in embodiments.

Figure 9:
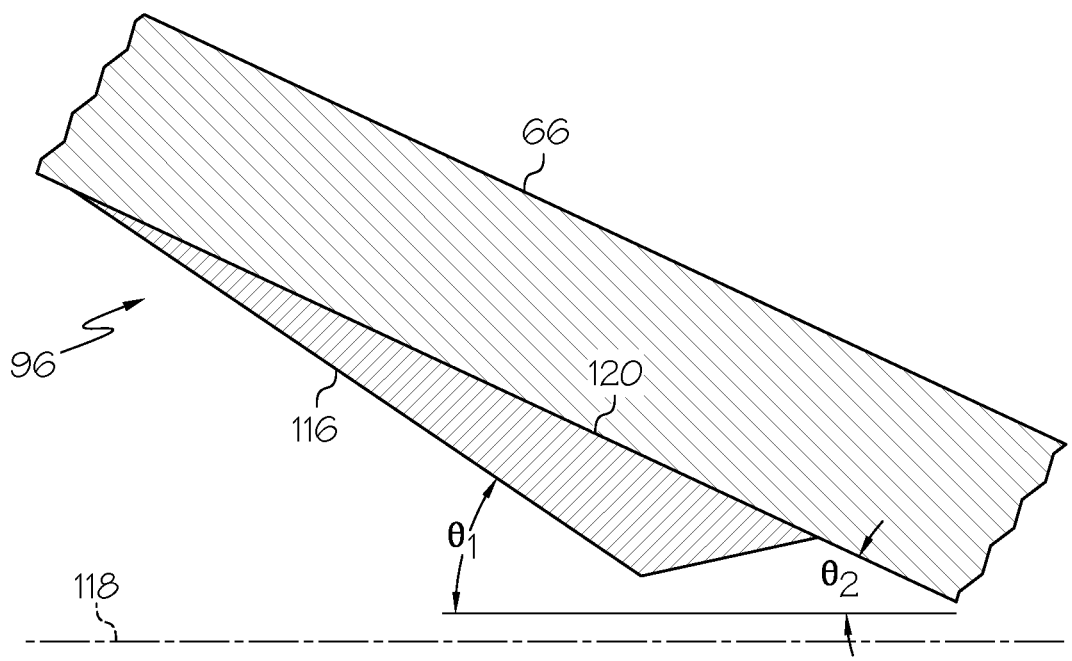

Lastly, FIG. 9 further illustrates another type of topological feature 116 potentially included in embodiments of the SFOD endwall treatment, such as SFOD endwall treatment 96 shown in FIG. 4. In this particular example, topological feature 116 assumes the form of a raised, elongated ridge having a ramped profile or geometry, as taken in a fore-aft direction. Accordingly, the height of topological feature 116, as measured relative to inner circumferential surface 120 of outer duct endwall 66, increases moving along the flow passage centerline in a fore-aft direction. Correspondingly, the spine of topological feature 116 forms a convergence angle $\theta_1$ with an axis 118 parallel to the flow passage centerline, which exceeds the convergence angle ($\theta_2$) formed between duct endwall surface 120 and axis 118. By imparting topological feature 116 with such a ramp-like geometry, SFOD objects may be imparted with a trajectory having a greater inward radial component toward the flow passage centerline upon impingement with feature 116.

Figure 10:
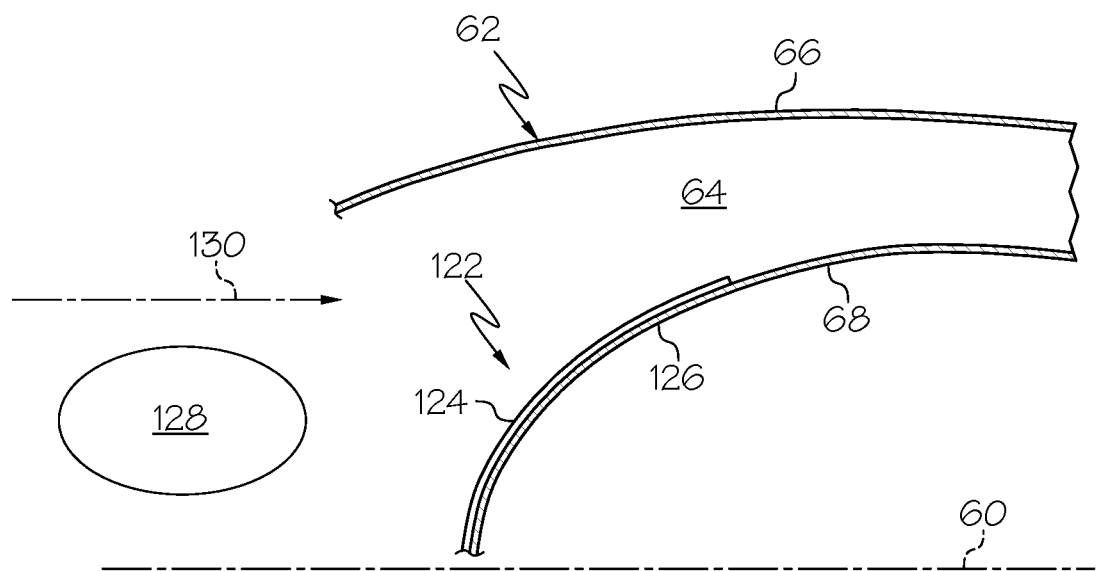
FIG. 10 is a cross-sectional view of a leading portion of the GTE intake section shown in FIG. 4, which illustrates another duct location at which topological features contained in the SFOD endwall treatment may be provided in addition to or in lieu of another location, such as that shown in FIG. 4.

Further Discussion of Other Endwall Locations in which the Topological Features May be Usefully Formed FIG. 10 is a cross-sectional view of a different portion of GTE compressor section 56 (FIG. 4), which illustrates another location at which topological features 124 included in SFOD endwall treatment 96 may be selectively applied or provided in addition to or in lieu of the location shown in FIG. 4. Specifically, in the illustrated example, inner duct endwall 68 includes a leading terminal end portion 122 having a bullnose or conical shape. Flow passage centerline 60 transects leading end portion 122, which diverges radially therefrom moving in a fore-aft direction. Topological features 124, which are generically shown in FIG. 10 and may include any of the features described above in conjunction with FIGS. 5-8, are formed on inner duct endwall 68; e.g., at location extending around and coaxial with centerline 60. For example, in one implementation, topological features 124 may be provided on the forward most surface of inner duct endwall 68 in a grouping around centerline 60. This region of inner duct endwall 68 is relatively prone to impact with SFOD objects, such as SFOD object 128 further generically shown in FIG. 10. When impinging against topological features 124, as indicated in by arrow 130, SFOD object 128 is divided or cleaved into smaller pieces by features 124 in a manner similar to that described above in connection with FIG. 2. Thus, topological features 124 may help reduce peak physical damage to components downstream of intake flow passage 64 (e.g., impeller 72 shown in FIG. 4) in the previously-described manner.

CONCLUSION

The foregoing has thus disclosed GTE compressor sections and intake ducts having SFOD endwall treatments, which reduce peak damage or physical distortion to GTE components (e.g., compressor rotors) resulting from SFOD ingestion. The endwall treatments may urge (or at least to better enable) SFOD objects impacting topological features included in the endwall treatment to travel in radially inward directions toward the flow passage centerline before exiting the flow passage and entering an inlet of a compressor rotor in embodiments. Additionally or alternatively, the above-described SFOD endwall treatments may help cleave or break-up larger SFOD bodies into multiple, smaller pieces having reduced volumes to further reduce peak physical damage to GTE components in the event of SFOD ingestion. The SFOD endwall treatments may include various types of topological features, including raised surfaces and/or recessed surface features. The features may be integrally formed with a duct endwall as a single (e.g., cast or additively manufactured) piece in embodiments; however, this not necessary is all implementations. Embodiments of the above-described SFOD endwall treatments can be integrated into compressor intake ducts with nominal added manufacturing costs, weight increase, and aerodynamic penalties, as is desirable in the case of propulsive GTEs carried by aircraft.

While multiple exemplary embodiments have been presented in the foregoing Detailed Description, it should be appreciated that a vast number of variations exist. It should also be appreciated that the exemplary embodiment or exemplary embodiments are only examples, and are not intended to limit the scope, applicability, or configuration of the invention in any way. Rather, the foregoing Detailed Description will provide those skilled in the art with a convenient road map for implementing an exemplary embodiment of the invention. It being understood that various changes may be made in the function and arrangement of elements described in an exemplary embodiment without departing from the scope of the invention as set-forth in the appended Claims.

What is claimed is:

1. A Gas Turbine Engine (GTE) compressor section, comprising:
    a compressor rotor having an inlet; and
    a compressor intake duct upstream of the compressor rotor, the compressor intake duct comprising:
        an intake flow passage extending through the compressor intake duct, having a flow passage centerline defined at a center of the compressor intake duct and that extends to a center of the inlet of the compressor rotor, and the intake flow passage fluidly coupled to the inlet of the compressor rotor;
        a first duct endwall extending around the flow passage centerline and bounding a peripheral portion of the intake flow passage, the first duct endwall having an inner surface defining the intake flow passage; and
        protrusions projecting into the intake flow passage from the inner surface from the first duct endwall, the protrusions rising into the intake flow passage from the inner surface and configured to redirect and/or divide into a plurality of pieces, soft foreign object debris (SFOD) to avoid damage to the compressor rotor,
        wherein the SFOD is debris entering the intake flow passage that if not redirected tends to flatten against the first duct endwall upon impact therewith and tends to follow the first duct endwall and impact the compressor rotor at an outer peripheral region thereof,
        wherein the protrusions are localized, meaning smooth areas of the inner surface separate the protrusions from one another,
        wherein the protrusions are configured to redirect the SFOD, in a radially inward direction toward the flow passage centerline prior to discharge of the SFOD from the intake flow passage and into the compressor rotor,
        wherein the protrusions are configured to redirect the SFOD to separate from the first duct endwall, so that the SFOD is ingested into the compressor rotor toward the flow passage centerline instead of at the outer peripheral region of the compressor rotor.

2. The GTE compressor section of claim 1 wherein the smooth areas between the protrusions are free of inconsistencies in the inner surface.

3. The GTE compressor section of claim 1 wherein the protrusions have side walls that join with the inner surface at angles that vary from perpendicular relative to the inner surface.

4. The GTE compressor section of claim 1 wherein the protrusions each have a length and a spine along the length, wherein an upstream section of the spine forms a first convergence angle relative an axis parallel to the flow passage centerline, wherein a downstream section of the spine forms a second convergence angle relative the axis parallel to the flow passage centerline, wherein the first convergence angle is greater than the second convergence angle.

5. The GTE compressor section of claim 1 wherein the protrusions comprise raised ridges on the first duct endwall that extend toward the flow passage centerline, wherein the raised ridges have ramp-like shapes, wherein the raised ridges extend further toward the flow passage centerline when moving in a downstream direction along the flow passage centerline.

6. The GTE compressor section of claim 1 wherein the protrusions comprise raised features conical protrusions projecting from the first duct endwall into the intake flow passage, wherein the conical projections taper to a point in a direction toward the flow passage centerline.

7. The GTE compressor section of claim 6 wherein the protrusions decrease in width when moving in a radially inward direction away from the first duct endwall and toward the flow passage centerline.

8. The GTE compressor section of claim 1 comprising a second duct endwall, wherein the first duct endwall comprises an outer wall of the compressor intake duct and the second duct endwall comprises an inner wall of the compressor intake duct, wherein the protrusions are disposed on both the first duct endwall and the second duct endwall.

9. The GTE compressor section of claim 1 wherein the protrusions have an elongated length along the flow passage centerline, and have ramped geometries, which increase in height with increasing proximity to the inlet of the compressor rotor along the elongated length.

10. The GTE compressor section of claim 1 wherein depressions are formed in the first duct endwall at locations adjacent the protrusions.

11. The GTE compressor section of claim 10 wherein the depressions comprise peripheral recesses; and
    wherein the protrusions have base portions defining peripheries wherein the peripheral recesses extend completely around and encircle the protrusions in the form of moats surrounding the protrusions.

12. The GTE compressor section of claim 11 comprising smooth areas of the inner surface between adjacent of the moats, wherein the smooth areas are free of inconsistencies in the inner surface.

13. The GTE compressor section of claim 12 wherein the peripheral recesses comprise trenches having V-shaped cross-sectional geometries.

14. The GTE compressor section of claim 1 comprising recesses in the inner surface between the projections, wherein the recesses are elongated along a length in a direction parallel to the flow passage centerline, wherein the recesses have feature depths, which decrease along the length with increasing proximity to the inlet of the compressor rotor.

15. The GTE compressor section of claim 1 wherein the protrusions comprise localized protrusions that extend radially inward from the first duct endwall, wherein each localized protrusion tapers to a point as the localized protrusion extends radially inward.

16. The GTE compressor section of claim 1 wherein the first duct endwall comprises a conical section having an inflection point, and wherein the protrusions terminate at or adjacent the inflection point as taken along the centerline in a fore-aft direction.

17. The GTE compressor section of claim 1 wherein the first duct endwall comprises an outer duct endwall and the intake flow passage further comprises an inner duct endwall; the intake flow passage has a radial width, as measured between the outer duct endwall and the inner duct endwall along a radial axis perpendicular to the flow passage centerline; and wherein each of the protrusions has a maximum width dimension as measured about an inner circumference of the first duct endwall; wherein the width dimension is approximately 10% of the radial width of the intake flow passage.

18. A compressor intake duct for use within a Gas Turbine Engine (GTE) compressor section having a compressor with a compressor rotor where the compressor intake duct channels an intake flow to the compressor rotor, the compressor intake duct comprising:

an intake flow passage having a centerline, the intake flow passage defined by the intake duct to direct the intake flow, in entirety, to the compressor rotor, without a separate scavenge or debris flow stream;

a first duct endwall bounding a peripheral portion of the intake flow passage; and raised structures provided on the first duct endwall, the raised structures projecting into the intake flow passage and configured to redirect and/or divide into a plurality of pieces, soft foreign object debris (SFOD) to avoid damage to the compressor rotor, wherein SFOD is debris entering the intake flow passage that if not redirected tends to flatten against the first duct endwall upon impact therewith and if not redirected tends to follow the first duct endwall and impact the compressor rotor at an outer peripheral region thereof, wherein the raised structures are configured to redirect the SFOD to separate from the first duct endwall, so that the SFOD is ingested into the compressor rotor toward the centerline of the flow passage instead of at an outer peripheral region of the compressor rotor.

19. The compressor intake duct of claim 18 wherein the first duct endwall comprises an outer duct endwall bounding an outer peripheral portion of the intake flow passage; and wherein the raised structures include radially inward ends with pointed tips configured to break up the SFOD.

20. A compressor intake duct for use within a Gas Turbine Engine (GTE) compressor section having a compressor with a compressor rotor, where the compressor intake duct defines a flow passage with a centerline and channels flow to the compressor rotor, the compressor intake duct comprising:

a duct endwall with an inner surface defining the flow passage, the duct endwall configured to be impacted by soft foreign object debris (SFOD) passing through the flow passage, wherein SFOD is debris entering the compressor intake duct that if not redirected tends to flatten against the duct endwall upon impact therewith and if not redirected tends to follow the duct endwall and impact the compressor rotor at an outer peripheral region thereof; and raised structures extending into the flow passage from the inner surface of the duct endwall to tips, the tips of the raised structures pointed for interaction with the SFOD to redirect and/or break up the SFOD so that the SFOD impacts the compressor rotor toward the flow passage centerline rather than at an outer peripheral portion of the compressor rotor, smooth areas defined by the inner surface between the protrusions, wherein the smooth areas are free of inconsistencies in the inner surface wherein the raised structures each tapers to a point in a direction toward the flow passage centerline, the points configured to break up the SFOD.

\* \* \* \* \*

UNITED STATES PATENT AND TRADEMARK OFFICE
CERTIFICATE OF CORRECTION

PATENT NO. : 10,947,901 B2
APPLICATION NO. : 16/201635
DATED : March 16, 2021
INVENTOR(S) : Timothy Darling and Costantinos Vogiatzis It is certified that error appears in the above-identified patent and that said Letters Patent is hereby corrected as shown below:

In the Claims

Column 14, Line 14, after "comprise" delete "raised features"

Signed and Sealed this
Eighth Day of June, 2021

Drew Hirshfeld
*Performing the Functions and Duties of the*
*Under Secretary of Commerce for Intellectual Property and*
*Director of the United States Patent and Trademark Office*